June 5, 1956  C. H. MacINTYRE  2,749,062
PRESSURE CONTROL SYSTEM FOR AN AIRCRAFT FUEL TANK
Filed June 27, 1952
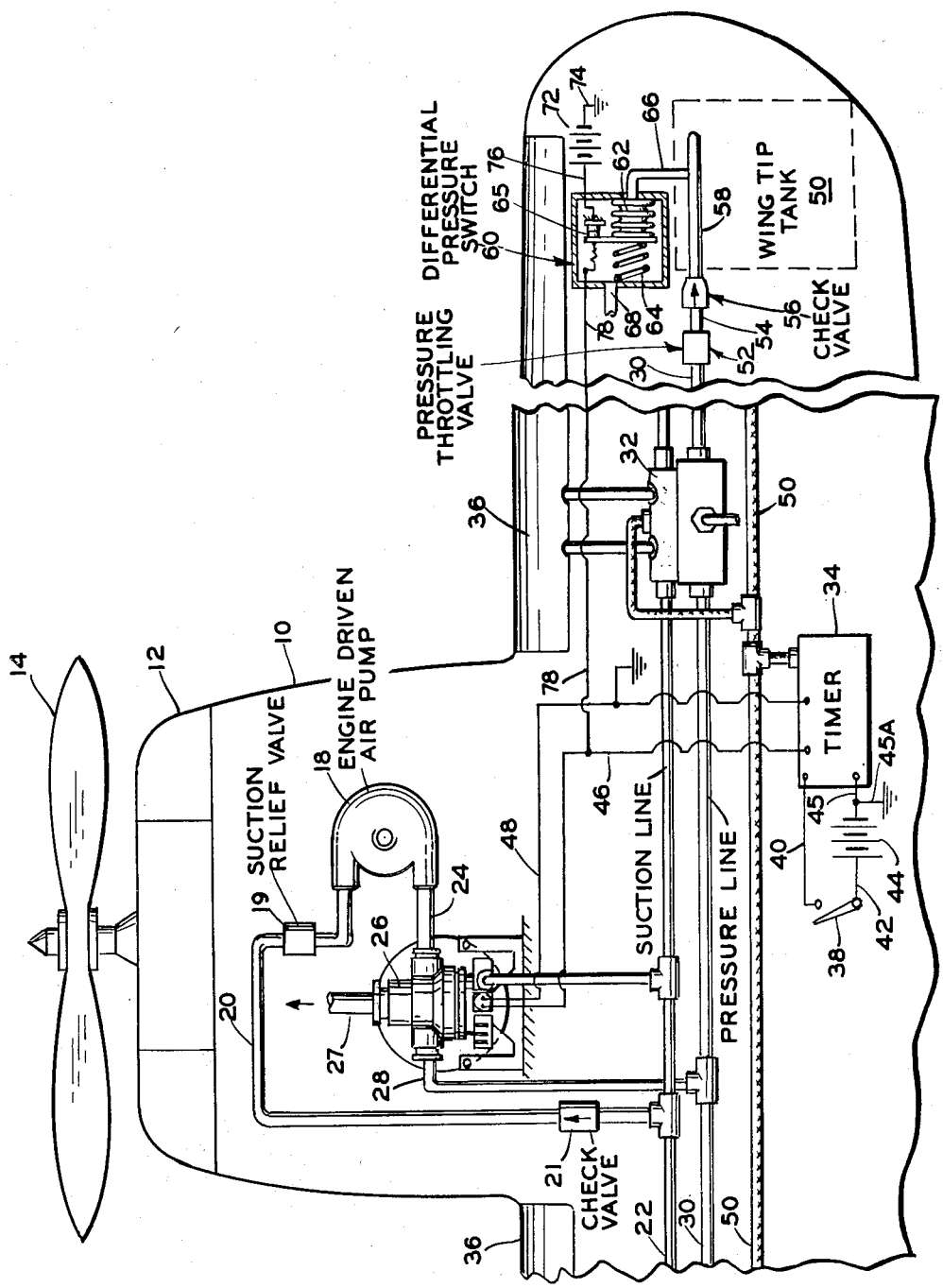
INVENTOR.
CHARLES H. MACINTYRE
BY Herbert L. Davis
ATTORNEY

United States Patent Office 2,749,062
Patented June 5, 1956

2,749,062

PRESSURE CONTROL SYSTEM FOR AN AIRCRAFT FUEL TANK

Charles H. MacIntyre, Hasbrouck Heights, N. J., assignor to Bendix Aviation Corporation, Teterboro, N. J., a corporation of Delaware Application June 27, 1952, Serial No. 296,055

2 Claims. (Cl. 244—135)

The present invention relates to a pressure control system and more particularly to a novel system for effecting pressurization of a fuel tank of an aircraft engine from a pressure system for inflatable ice elimination elements of the aircraft. The fuel tank is of a conventional type mounted at the tip of the wing of the aircraft so as to carry the fuel for the engine of the aircraft under suitable fluid pressure.

An object of the invention is to provide novel means for utilizing the pressure system for the inflatable ice eliminating elements so as to perform the dual function of pressurizing a fuel tank of the aircraft during both operation and non-operation of the inflatable ice eliminating system.

Another object of the invention is to provide a control system including a pressure differential switch responsive to atmospheric and tank pressures to control the application of fluid pressure to the pressure manifold of the ice eliminating elements and to the wing tip tanks so as to effect normal pressurization of the wing tip tanks during non-operation of the ice eliminating system.

The above and other objects and features of the invention will appear more fully hereinafter from a consideration of the following description taken in connection with the accompanying drawing wherein one embodiment of the invention is illustrated by way of example.

The drawing is a fragmentary plan view of an aircraft showing diagrammatically the manner in which the wing tip tank pressure control system is operatively connected into the pressure control system for the inflatable ice eliminating elements.

Referring to the drawing there is shown an aircraft 10 having a power plant or engine 12, a propeller 14 driven thereby and an ice eliminating system.

Reference is made to copending application Serial No. 207,813, now Patent No. 2,684,818, for a complete description of the construction and operation of the ice eliminating system. The application Serial No. 207,813, now Patent No. 2,684,818, was filed January 23, 1951, in the name of Howard A. Alexanderson and assigned to Bendix Aviation Corporation.

As shown in the drawing and for purposes of describing the present invention, the ice-eliminating system comprises a pump 18 adapted to be driven in a conventional manner from the engine 12. The negative pressure or suction side of pump 18 is connected through a suction relief valve 19, conduit 20 and check valve 21 to the main suction line 22, while the positive pressure side thereof is connected through a conduit 24 to the inlet of a pressure unloading valve 26 controlled by a solenoid not shown. The unloading valve 26 may be of the type shown in copending application Serial No. 733,960, filed March 11, 1947, and now U. S. Patent No. 2,663,522, granted December 22, 1953, in the name of Donald M. Lawrence and assigned to Bendix Aviation Corporation or may be of the type described in U. S. Patent No. 2,476,198, granted July 12, 1949, to Donald M. Lawrence and assigned to Bendix Aviation Corporation.

The fluid discharged from the pump 18 passes to the valve 26 where upon deenergization of the controlling solenoid it is vented or discharged to atmosphere through vent 27, while upon energization of the controlling solenoid the discharge fluid from pump 18 passes through a filter unit within the valve 26 and any particles of dirt or other extraneous matter in the fluid is filtered therefrom. The fluid under pressure thus processed is delivered through conduit 28 to a main pressure distribution line or manifold 30.

The main suction and pressure lines 22 and 30, respectively, lead to suitable air distributing valve mechanisms 32 of the type disclosed in U. S. Patent No. 2,515,519, granted July 18, 1950, to Donald M. Lawrence et al. and assigned to Bendix Aviation Corporation. A timer 34 effects energization of suitable solenoids controlling the valves 32 in a manner to sequentially operate the inflatable elements or boots 36 carried by the aircraft 10, as described in the U. S. Patent No. 2,515,519.

Reference is made to the aforenoted U. S. Patent No. 2,515,519 for a detailed description of the construction and operation of the valves 32. For purposes of the instant invention, the valve mechanisms 32 are each provided with suitable solenoid actuated means which solenoids when energized in response to the operation of the timer 34, actuate suitable means to cause the valve mechanisms to pass the positive fluid pressure from the manifold 30 into the inflatable elements 36 to thereby inflate the same. When, due to the operation of the timer 34, the control solenoids of the valves 32 are de-energized, the valves 32 connect the inflatable elements 36 to the negative pressure or suction manifold 22 to the end that the boots 36 are deflated and held against the structure of the wing by the suction in line 22. The timer 34 may be of a type such as described and claimed in the U. S. application Serial No. 207,813, now Patent No. 2,684,818.

The operation of the timer 34 and solenoid controlled valve mechanisms 26 and 32 may be directly controlled through operation of a manually operated switch 38 connected to the timer 34 through suitable electrical conductors 40 and 42 leading from one side of a suitable source of electrical energy such as a battery 44. The opposite side of the battery 44 is connected through a conductor 45 to the timer 34. As indicated in the drawing the conductor 45 is a grounded at 45A. The timer 34 is electrically associated with the control solenoid of the valve 26 through leads 46 and 48 and with the control solenoids of the valves 32 by an electrical cable 50 and serves to periodically energize such control solenoids from the source of electrical energy 44 as described in the copending application Serial No. 207,813, now Patent No. 2,684,818. Thus the opening of switch 38 serves in normal operation to de-energize the timer 34 as well as the control solenoids for the valve mechanisms 26 and 32.

When the switch 38 is closed, the timer 34 operates the valves 26 and 32 through the control solenoids thereof in the manner hereinbefore set forth to actuate the inflatable elements or boots 36. The cycle of operation of the timer 34 may be of any predetermined period of time, for example, the timer 34 may control the valves 32 so as to selectively control the delivery of positive and negative fluid pressure to the boots 36 to inflate and deflate the same in sequence and then, to maintain all of the boots 36 in a deflated condition under suction of the pump 18 for a predetermined period of time. During this latter portion of the timing cycle no positive fluid pressure is normally delivered to the pressure distribution line 30 since the control solenoid for the valve 26 is de-energized through operation of the timer 34 and valve 26 is discharging to atmosphere through the vent line 27, as explained in detail in the aforenoted application Serial No. 207,813 now Patent No. 2,684,818.

In order to utilize the positive pressure available from the compressor 18 to pressurize suitable fuel tanks of conventional type carried at the opposite tips of the wing of the aircraft, one of which is indicated by the numeral 50, the pressure conduit 30 is connected through a pressure throttling valve 52, conduit 54, check valve 56, and conduit 58 to the wing tip tank 50 to maintain the same under suitable fluid pressure.

The throttling valve 52 is of a conventional type and is arranged to reduce the pressure applied to line 54 from the pressure line 30 to the required pressure for the tank 50. The check valve 56 permits fluid medium under pressure to flow from line 54 into line 58, but prevents reverse flow of fluid under pressure from line 58 to line 54.

There is further provided a differential pressure switch 60 which may be of a conventional type, and shown herein schematically as including a bellows 62 biased by a setting spring 64 to control a switch 65. The bellows 62 is arranged so as to have its interior connected by a conduit 66 to the conduit 58 leading to the fuel tank 50 and thereby sense the pressure applied to the fuel tank 50. The exterior surface of the bellows 62 is exposed to the ambient atmospheric pressure applied through a conduit 68. The bellows 62 controls the switch 65 in response to the difference between ambient atmospheric and tank pressures. Thus upon the tank pressure dropping below a predetermined value in excess of the prevailing atmospheric pressure, the switch 65 closes an electrical circuit from a battery 72 to energize the control solenoid for the valve 26.

One terminal of the battery 72 is connected by a conductor 74 to a ground common to that to which conductor 48 is connected as shown diagrammatically in the drawing. The opposite terminal of the battery 72 is connected through a conductor 76, switch 65, and conductor 78 to the conductor 46 so as to effect energization of the control solenoid for the valve 26 upon closure of the switch 65. The energization of the control solenoid for the valve 26 in turn directs discharge pressure from the pump 18 into the pressure line 30 which in turn builds up the pressure in the pressure conduit 30 and to the tip tanks 50 to that required. The latter operation is particularly effective during non-operation of the inflatable ice eliminating system. When the pressure in the tip tank 50 reaches the value required, the differential bellows 62 opens the switch 65 whereupon the control solenoid for the valve 26 is de-energized and the valve 26 thereupon vents the discharge from the pump 18 to atmosphere to unload the pump 18 at such times as the fluid discharge pressure medium is not needed.

In the pressurization of the tanks 50, it will be seen that the check valve 56 serves to hold the pressure in the tanks 50, while the throttling valve 52 serves to reduce the pressure applied to the tank 50 from the main pressure line 30 to the predetermined required value.

Although only one embodiment of the invention has been illustrated and described, various changes in the form and relative arrangements of the parts may be made to suit requirements.

What is claimed is:

1. For use with pressure operated devices on an aircraft; the combination comprising a source of fluid pressure medium, a fluid pressure manifold to operate the devices, a solenoid operated valve controlling delivery of said fluid pressure medium from said source to the fluid pressure manifold, a fuel tank, a fluid pressure throttling valve connected to said manifold and controlling the delivery of the fluid pressure medium from said manifold to said tank, a check valve between said throttling valve and tank to prevent reverse flow of fluid medium under pressure from the tank to the manifold, and differential pressure responsive means sensitive to the difference between ambient atmospheric pressure and the fluid pressure medium at said tank, means operatively connecting said differential pressure responsive means to said solenoid operated valve for controlling the solenoid operated valve so as to cause delivery of the fluid pressure medium from said source to said manifold and through said throttling and check valves to said tank upon the differential pressure decreasing below a predetermined minimum.

2. For use in an air pressurization system for air pressure operated devices on an aircraft; the combination comprising a pump for supplying air under pressure, a pressure manifold, a conduit connecting said pump to said manifold, a solenoid operated control valve in said conduit to selectively connect said pump through said conduit to said manifold and alternatively to vent said conduit to atmosphere, a timer, means electrically connecting said timer to said control valve, said timer to operate said control valve through said connecting means for predetermined intervals of time so as to cause said pump to supply the manifold with air under pressure through said solenoid operated control valve, a fuel tank, means for connecting said pressure manifold to said tank for pressurizing the tank under air pressure from said manifold, said connecting means including an air pressure throttling valve and an air check valve to prevent reverse flow of air under pressure from said tank to the pressure manifold, a differential air pressure responsive switch mechanism operative in response to a predetermined differential between prevailing atmospheric and tank air pressure, means electrically connecting said switch mechanism to said solenoid operated control valve to cause operation of said control valve independently of said timer, whereby the response of said differential air pressure responsive switch mechanism to said predetermined pressure differential establishes an electrical circuit to operate said solenoid operated control valve so as to deliver air pressure to said pressure manifold to pressurize the fuel tank upon the timer failing to effect sufficient pressurization of the manifold and tank during said predetermined intervals of time.

References Cited in the file of this patent

UNITED STATES PATENTS

| | | |
|---|---|---|
| 2,146,729 | Gavin | Feb. 14, 1939 |
| 2,383,369 | Curtis | Aug. 21, 1945 |
| 2,439,458 | Eaton | Apr. 13, 1948 |
| 2,476,198 | Lawrence | July 12, 1949 |
| 2,515,519 | Lawrence et al. | July 18, 1950 |
| 2,580,467 | Samiran | Jan. 1, 1952 |
| 2,645,409 | Lawler | July 14, 1953 |
| 2,654,553 | Noon et al. | Oct. 6, 1953 |

FOREIGN PATENTS

| | | |
|---|---|---|
| 285,312 | Great Britain | Feb. 16, 1928 |